2,950,609
FLEXIBLE COUPLING

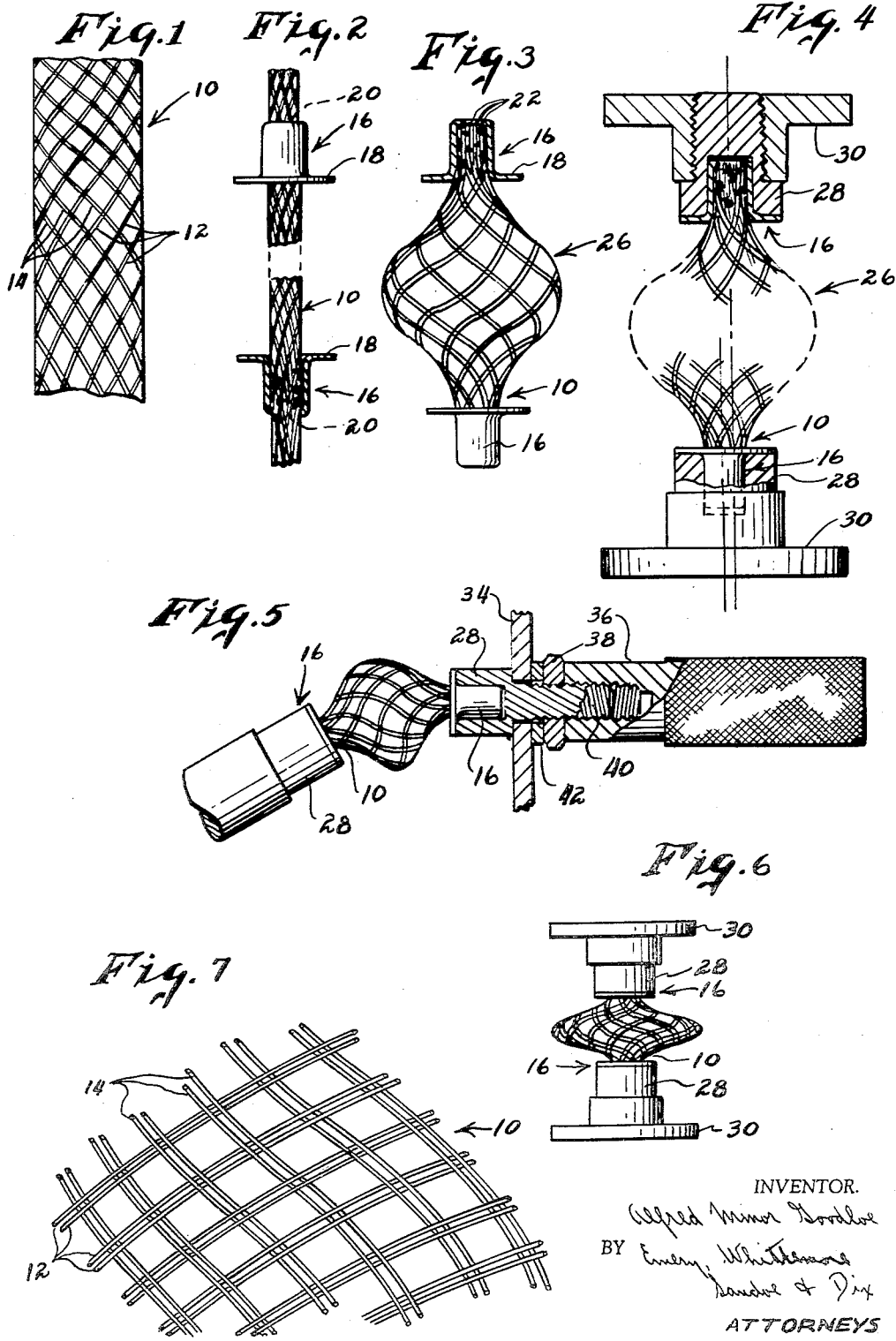

Alfred Minor Goodloe, Westfield, N.J., assignor to Metal Textile Corporation, Roselle, N.J., a corporation of Delaware Filed Sept. 15, 1959, Ser. No. 840,092

10 Claims. (Cl. 64—15)

This invention relates to flexible coupling structures and to methods of making them. The invention relates more particularly to a flexible coupling structure made from a tubular element having spring wires, some of which form right-hand helixes and others of which form left-hand helixes, the helixes of opposite lay being interlaced, that is, the wires of the right-hand helixes passing alternately over and under the wires of the left-hand helixes, and the tubular element being bulged.

It is an object of the invention to provide an improved flexible coupling for transmitting torque between rotatable elements regardless of axial misalignment, angular misalignment and variations in axial spacing of the elements between which the torque is to be transmitted. The invention is intended primarily for transmitting light torque from small motors and for transmitting torque from manually operated knobs or other elements to instrument control devices.

Another object of the invention is to provide an improved method for making flexible couplings of the character indicated.

Although intended for a coupling to transmit torque, the coupling of this invention can be used for other purposes, such as special spring installations and for vibration damping. Other objects, features and advantages of the invention will appear or be pointed out as the description proceeds.

In the drawing, forming a part hereof, in which like reference characters indicate corresponding parts in all the view:

Figure 1 is a view of a portion of a flexible tubular element from which the couplings of this invention are made;

Figure 2 is a view showing the way in which the tubular element is pulled down to a small diameter and assembled with wires for making the flexible coupling;

Figure 3 is a view, mostly in section, showing a flexible coupling made in accordance with this invention;

Figure 4 is a view similar to Figure 3 but showing the end fittings of the flexible coupling in axial misalignment;

Figure 5 is a view, partly in section, showing a modified form of the invention with the end fittings in angular misalignment;

Figure 6 is a view similar to Figure 3 but illustrating the operation of the coupling when the axial spacing of the end fittings is reduced; and Figure 7 is a greatly enlarged fragmentary view illustrating the relation of the spring wires in a construction using double wires.

Figure 1 shows a flexible element 10 consisting of a tube formed of spring wires 12 and 14. Those wires designated by the reference character 12 form right-hand helixes and the wires designated by the reference character 14 form left-hand helixes. The wires 12 are spaced from one another, and the wires 14 are also spaced from one another; but the wires of opposite lay are interlaced, that is, the wires of the right-hand helixes pass alternately over and under wires of the left-hand helixes.

This construction of the flexible element or tube 10 provides an open construction with interstices of substantial cross section between wires 12 and 14, and the wires are made of spring material so that the element or tube 10 can be bent and will return to its original condition within limits. The spring wires, however, are not hard enough to break, even though bent quite sharply.

Figure 2 shows a step in the method of making the flexible coupling of this invention. The tubular element 10 is drawn out to an increased length by a strong axial pull, and through a die, if necessary. This operation reduces the diameter of the tube 10 so that all of the wires are close to the longitudinal axis of the tube. Two eyelets 16 are threaded over the thinned-down tube 10. Each of the eyelets has a flange 18 and the eyelets are placed on the tube 10 with the flanges 18 confronting one another. The eyelets are spaced axially on the tube 10 with sufficient length of the tube between them to supply the material necessary for a particular coupling. The tube is then cut at upper and lower lines 20. The portions of the tube 10 within the eyelets 16 are then secured to the eyelets by solder 22. In the broader aspects of the invention, this solder 22 is merely representative of means for securing the eyelets to the ends of the cut length of the tube 10.

The eyelets are then urged together along the axis of the tube 10 and this causes the free length of the tube to form a bulge 26, as shown in Figure 3. The eyelets are pushed close together so that the wires are bent beyond their elastic limits, and when the axial end pressure is released, the wires of the tube 10 spring back to a bulged position, such as shown in Figure 4.

The wires in the bulge 26 are still in their helical form, the terms "helical" and "helix" being used herein to designate a course in which a wire follows a combined axial and circumferential path but without being limited to a uniform radius for the circular path. For example, the radius of each helix in the bulge 26 increases progressively to a maximum at a mid region of the bulge and then decreases to a substantially smaller radius at the end of the bulge.

The eyelets 16 are used to connect the coupling to end fittings 28, to which the eyelets are soldered or otherwise secured. In the construction illustrated, the end fitting 28 threads into a flange 30 by which the coupling is connected to an actuator or to a part which is to be turned by torque transmitted through the coupling.

Figure 4 shows the upper end fitting 28 with its axis parallel to that of the lower end fitting 28, but these axes are offset from one another. This causes a distortion of the bulge 26 and requires some bending of the wires as the bulge rotates during transmission of torque from one end fitting to the other.

Figure 5 shows a modified construction in which the upper end fitting 28 extends through a fixed panel 34. A manually-operated knob or actuator 36 threads over the outer part of the end fitting 28 and is locked to the end fitting by a lock nut 38 which fits the same threads 40 as hold the actuator 36. A washer 42 bears against the front of the panel 34. The lower end fitting 28 connects with an element of a controller which is to be adjusted from the knob or actuator 36.

In Figure 5 the upper and lower end fittings 28 are in axial misalignment, and the bulge 26 is distorted in a somewhat different way than in Figure 4, the wires being bent more sharply on one side than on the other. The bulge 26 will transmit torque, however, with axial misalignments approaching 90°, even though the misalignment changes from time to time with change of temperature, or is constantly changing as a result of a vibration mounting for the instrument to which torque is transmitted by the lower end fitting 28.

The flexible coupling of this invention can be used for transmitting torque between rotary elements which have both axial misalignment, as in Figure 4, and angular misalignment, as in Figure 5.

Figure 6 shows the way in which the bulge is distorted to a shorter axial length and greater maximum diameter when the axial spacing of the end fittings 28 becomes less. Conversely, the bulge 26 will elongate and its maximum diameter will become less as the end fittings 28 move apart axially. It is one of the advantages of this invention that it operates equally well in spite of changes in the axial spacing of the end fittings 28 within very wide limits. For example, the end fittings can move closer together until they almost contact one another, though actual contact is impossible because of the spring wires in the bulge 26. As the end fittings move apart in an axial direction, the diameter of the bulge 26 may decrease until it approaches that of the portions of the tube within the eyelets 16. If the bulge is entirely lost, however, as a result of increased axial length of the coupling, the strength of the coupling is greatly impaired and the improved operation of the coupling, as compared with ordinary springs, is largely lost.

The wires used for the coupling are preferably round wires made of steel, but other kinds of wire can be used. Steel has the advantage of good spring quality over a wide range. Beryllium copper is also used and other materials which have good spring effect. The size and the number of wires employed in the tube may be varied. Small wires provide a more flexible coupling than larger wires of the same material. The choice of wire size and material depends upon the use for which the coupling is intended.

Figure 7 shows a construction in which double wires are used for the tube 10. Each of the wires 12 consists of two strands side-by-side; and Figure 7 also shows the way in which a double-strand wire 14 passes under the first of the double-strand wires 12 and then passes over the next of the double-strand wires 12. This construction is repeated around the entire circumference of the tube.

The preferred embodiment of the invention has been illustrated and described, but changes and modifications can be made and some features may be used in different combinations without departing from the invention as defined in the claims.

What is claimed is:

1. A coupling structure including a flexible tubular element made of spring wires, some of the wires forming right-hand helixes and other wires forming left-hand helixes, the wires of opposite lay being interlaced so that each wire of the right-hand helixes passes alternately over and under wires of the left-hand helixes, the coupling structure having end fittings spaced from one another axially along the length of the tubular element, and the tubular element between the end fittings being bulged so that the helixes increase in diameter from each end fitting to an intermediate region between the fittings where the helixes are of a maximum diameter.

2. The coupling structure described in claim 1 and in which the wires are springy and return to their original shape when the helixes are distorted by rotation of the bulge with the axes of the end fittings misaligned with one another.

3. The coupling structure described in claim 2 and in which the wires are round steel wires.

4. The coupling structure described in claim 2 and in which each of the wires is a multi-strand wire for increasing the flexibility of a coupling of a given strength.

5. The coupling structure described in claim 1 and in which the portions of the tube within the end fittings are radially compressed so that the wires within each of the end fittings are in close proximity with one another.

6. The coupling structure described in claim 5 and in which the interstices between the wires in the end fittings are filled with solder.

7. The coupling structure described in claim 1 and in which all of the wires in each of the end fittings are bonded to the end fittings as a unitary structure.

8. A method of making a flexible coupling from a tube made of spring wire with the wires forming interlaced right and left-hand helixes, which method comprises placing end fittings over the tube, securing the end fittings to the tube in axially-spaced locations, and compressing the tube axially until the portion of the tube between the end fittings bulges to a diameter substantially larger than at the end fittings and with progressing decreases in the diameter of the bulge in the direction of the end fittings.

9. The method of making a flexible coupling as described in claim 8 and in which the end fittings are applied to a long length of tube, and the tube is cut off at an end fitting before being bulged, and in which the tube is secured to the end fittings by bonding the wire of the tube to the surrounding surfaces of the end fitting.

10. The method of making a flexible coupling, as described in claim 8, and in which the tube is first drawn down to a reduced diameter with the wires in close proximity to one another, and the end fittings are placed over the drawn-down tube and hold the wires in close proximity.

References Cited in the file of this patent

UNITED STATES PATENTS

| | | |
|---|---|---|
| 451,392 | Duc | Apr. 28, 1891 |
| 1,602,022 | Hetland | Oct. 5, 1926 |
| 2,047,329 | Peterson | July 14, 1936 |
| 2,352,391 | Kitselman | June 27, 1944 |